United States Patent [19]
Lee

[11] Patent Number: 5,220,639
[45] Date of Patent: Jun. 15, 1993

[54] MANDARIN SPEECH INPUT METHOD FOR CHINESE COMPUTERS AND A MANDARIN SPEECH RECOGNITION MACHINE

[75] Inventor: Lin S. Lee, Taipei, Taiwan

[73] Assignee: National Science Council, Taipei, Taiwan

[21] Appl. No.: 444,405

[22] Filed: Dec. 1, 1989

[51] Int. Cl.$^5$ .............................................. G10L 9/00
[52] U.S. Cl. ...................................................... 395/2
[58] Field of Search .................................. 381/41–45; 364/513.5

[56] References Cited

U.S. PATENT DOCUMENTS

| | | | |
|---|---|---|---|
| 4,587,670 | 5/1986 | Levinson et al. | 381/43 |
| 4,718,094 | 1/1988 | Bahl et al. | 364/513.5 |
| 4,759,068 | 7/1988 | Bahl et al. | 381/43 |
| 4,797,929 | 1/1989 | Gerson et al. | 381/43 |
| 4,797,930 | 1/1989 | Goudie | 381/52 |
| 4,803,729 | 2/1989 | Baker | 364/513.5 |
| 4,829,577 | 5/1989 | Kuroda et al. | 381/45 |
| 4,831,551 | 5/1989 | Schalk et al. | 364/513.5 |

Primary Examiner—Michael R. Fleming
Assistant Examiner—Michelle Doerrler
Attorney, Agent, or Firm—Cushman, Darby & Cushman

[57] ABSTRACT

A method of inputting Chinese characters into a computer directly from Mandarin speech which recognizes a series of monosyllables by separately recognizing syllables and Mandarin tones and assembling the recognized parts to recognize the mono-syllable using Hidden Markov Models. The recognized mono-syllable is used by a Markov Chinese Language Model in a Linguistic decoder section to determine the corresponding Chinese character A Mandarin dictation machine which uses the above method, using a speech input device to receive the Mandarin speech and digitizing it so a personal computer can further process that information. A pitch frequency detector, a Voice signal pre-processing unit, a Hidden Markov Model processor, and a training facility are all attached to the personal computer to perform their associated functions of the method above.

10 Claims, 12 Drawing Sheets

1. Description of a hidden Markov model (1) Initial Probabilities $$\pi = [\ \pi_1\ ,\ \pi_2\ ,\ \ldots\ ,\ \pi_N\ ]$$

(2) Transition Probabilities $$A = [\ a_{ij}\ ]$$

(3) Observation Probabilities $$B = [\ b_j\ (O_t)],\quad 1 \leq j \leq N,\quad 1 \leq t \leq T$$

\* The "Hidden Markov Model" is defined as $\lambda = (\pi, A, B)$

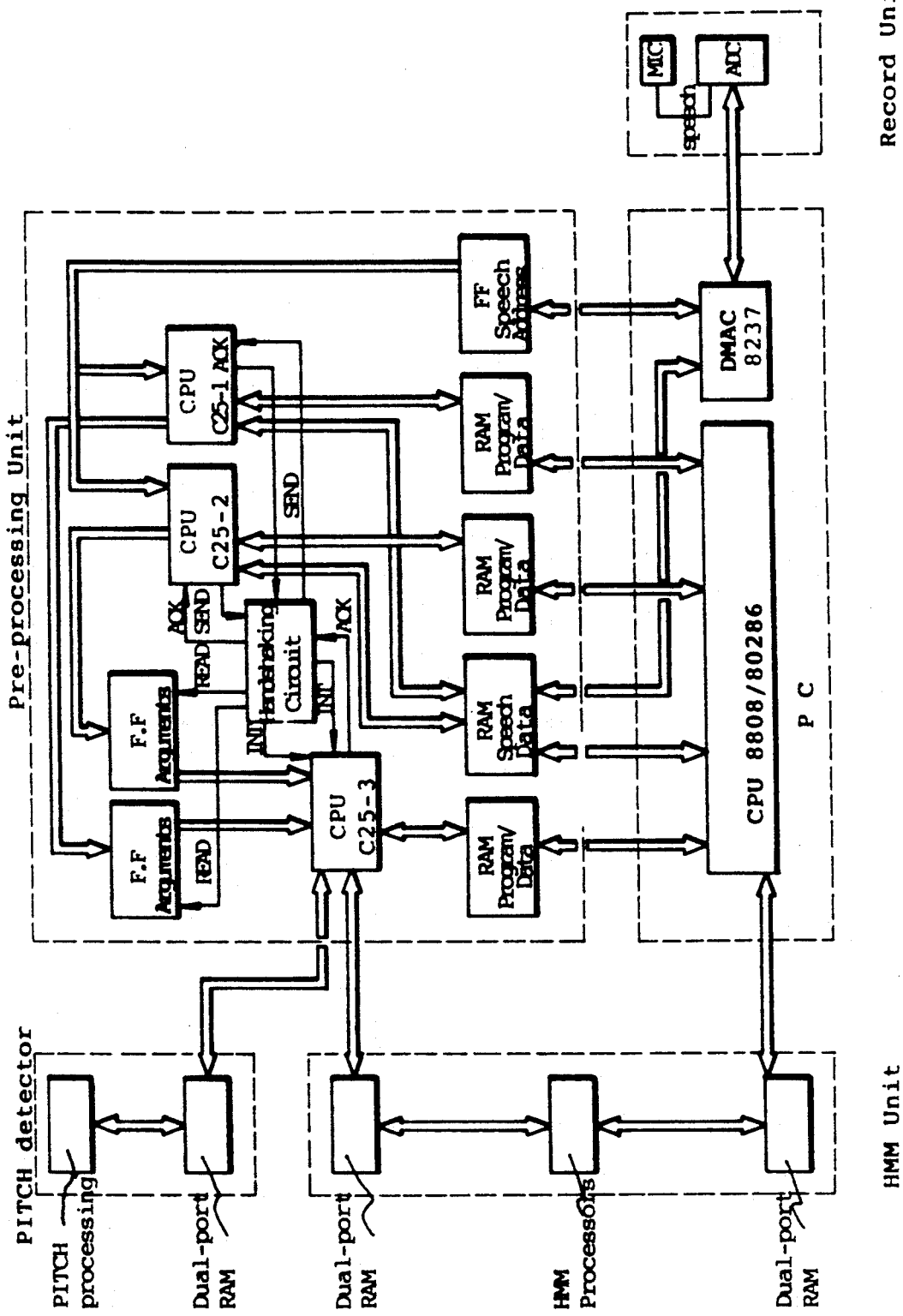

Flowchart of the overall software system used in the recognition phase

MANDARIN SPEECH INPUT METHOD FOR CHINESE COMPUTERS AND A MANDARIN SPEECH RECOGNITION MACHINE

BACKGROUND OF THE INVENTION

The present invention relates to a Mandarin speech input method for Chinese computers and a Mandarin dictation machine, in particular to a method in which Mandarin speech is used for inputting Chinese characters into computers, and a machine which converts the spoken Mandarin sentences into Chinese characters and displays them on the screen of a monitor.

Today, the methods of inputting Chinese characters into computers are numerous, for instance, those based on the pronunciation thereof, or based on word roots, or strokes. However, none of these methods have been recognized as a very convenient method of inputtings, because the inputting procedure is much less efficient as compared to those for alphabetic languages such as English. Some methods of inputting require special long term training, while other methods may be comparatively slow, or require memorizing numerous rules which may be easily forgotten as a result of infrequent use. For instance, the "phonetic symbol input method" is easily practised by everyone but the speed of keying is too slow. The fastest input methods are the "word root methods" such as Tsang-jiieh method. But, this method can only be used by those who have undergone a long term of input training This method may be forgotten if not frequently used and is inconvenient due to the fact that the Chinese characters have been intentionally modified so as to correspond to several of the keys of the keyboard In any case, the keyboard is initially designed for the alphabetic languages such as English and it is, therefore, inconvenient for keying Chinese characters.

The method of inputting Chinese characters by way of speech has long been proposed. In any case, the technique of inputting Chinese characters based on speech faces difficulties which are almost impossible to overcome. These difficulties are as follows:

(1) The necessary vocabulary for the Chinese language is too large for speech recognition technology. The Chinese characters commonly used are at least 15,000 and the commonly used Chinese words are at least 40,000;

(2) Large numbers of homonym characters exist for almost every pronunciation in Mandarin. That is, even though the pronunciation is correctly recognized, it is still difficult to obtain the exact characters;

(3) The transformation from Mandarin speech into Chinese characters has to be completed in real-time for the input method to be practically used.

SUMMARY OF THE PRESENT INVENTION

Therefore, it is the object of the present invention to provide a Mandarin speech input method and a Mandarin dictation machine which mitigate the above-mentioned drawbacks.

It is another object of the present invention to provide a Mandarin speech input method and a Mandarin dictation machine which employ, the "Hidden Markov Models" to recognize the Mandarin syllables, and employ the "Markov Models" to establish a Chinese language model to convert the recognized Mandarin syllables into the correct Chinese characters.

It is another object of the present invention to provide a Mandarin speech input method and a Mandarin dictation machine which can dictate Mandarin speech with a very large vocabulary and unlimited texts.

It is still another object of the present invention to provide a Mandarin speech input method and a Mandarin dictation machine which can convert Mandarin speech into Chinese characters in real-time.

These, and other objects and advantages of the present invention, will become more apparent from a consideration of the following detailed description of the preferred embodiments, when read in conjunction with the accompanying drawings.

BRIEF DESCRIPTION OF THE DRAWINGS

FIG. 6 illustrates the "Speech Signal Pre-processing unit" of FIG. 5 in accordance with the present invention;

DETAILED DESCRIPTION OF THE PREFERRED EMBODIMENT

Figure 1:
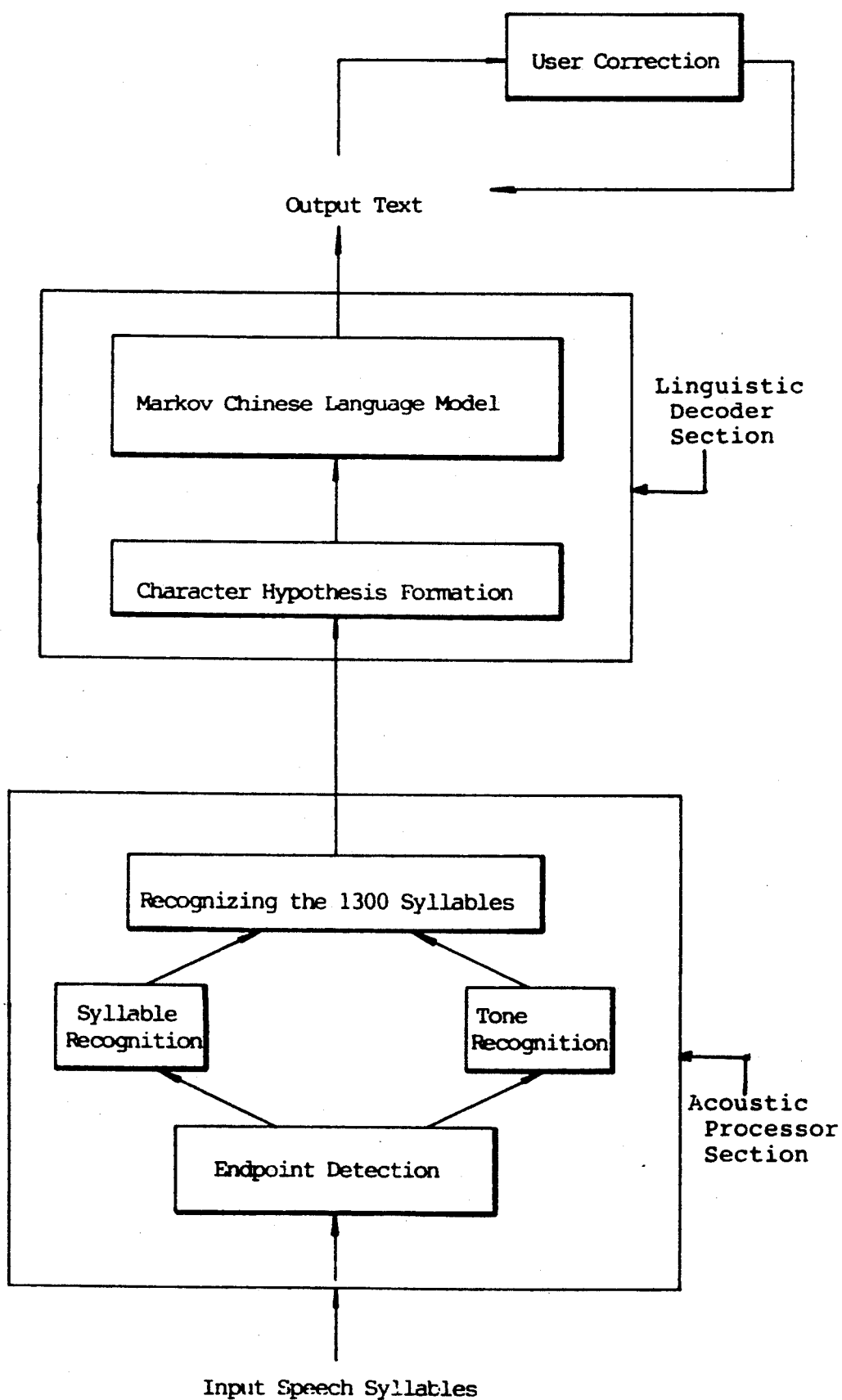
FIG. 1 is a schematic diagram showing the Overall System Structure for the Mandarin Dictation Machine in accordance with the present invention.

The present invention relates to a method of Mandarin speech input and a Mandarin dictation machine, in particular to a method of inputting Chinese characters into computers, and the machine used for said method of inputting. The machine in accordance with the present application can be used for the "dictation" of speech sentences spoken in Mandarin with unlimited texts. That is, the machine can recognize arbitrary sentences which have been spoken to the machine in Mandarin by the user. The machine converts the spoken sentences into the corresponding Chinese characters and displays them on the screen. The dictation machine is used as the input means for the input of Chinese characters into the computers. The machine acts as a "secretary" who inputs the Chinese characters into the computer after listening to the speech sentences spoken by the user. After these characters have been entered, the subsequent procedures such as amending, editing, storing, printing or transferring to a peripheral apparatus can be carried out. In short, this "dictation machine" enables the Chinese computer to "listen to" Mandarin speech. The machine in accordance with the present application is different from the conventional Mandarin speech recognizer in the following ways:

(1) It can accept Mandarin speech a very large vocabulary and unlimited texts, and (2) It works in real-time, i.e., the conversion of a sentence into Chinese characters is completed in a time interval not longer than the duration of the sentence.

In accordance with the present invention, the machine can realize the above features under the following requirements.

(1) Speaker Dependent: That is, a particular machine can only accept the speech of a particular user at a time. Every user can first speak to the machine such that his speech signal is used as the "Training Speech" for the machine. After the machine is "trained" by the "Training Speech" of a particular user, the machine can only accept the speech of the particular user. If the machine is then to be used by another user, another set of "Training Speech" from that user can then be entered. Those users speaking with different accent can also use the machine because their "Training Speech" will be in that particular accent. Basically, the machine in accordance with the present invention can accept Mandarin speech with any accent.

(2) The input speech is in the form of a series of "isolated mono-syllables": In Mandarin, every Chinese character is pronounced as a mono-syllable. But in a continuous sentence, the signals of each mono-syllable thereof join together. The co-articulation effect across syllables of the sentence makes the correct recognition of the mono-syllables difficult. In fact, the user can simply pronounce isolated mono-syllables of the characters for those input sentences and can still very conveniently and rapidly enter the Chinese characters, but the problem caused by co-articulation effect can be avoided.

(3) Allowance of errors in the input of Chinese characters: In fact, errors may occur in any method of input. If the erroneous characters can be displayed on the screen, the user can easily correct them using convenient software. Under such a condition, it is estimated that using the present invention about 180 characters per minute can be entered into the machine, of which about 20 characters need to be corrected. Due to the available convenient software for correction, the "net input" is about 150 characters per minute. It should be emphasized that the speed of the fastest input method currently available in Taiwan is about 150 characters per minute, but this is only achieved by very few people with an extremely large amount of professional training.

Referring to FIG. 1, the present invention mainly comprises an acoustic processor section and a linguistic decoder section. The acoustic processor section is responsible for the recognition of the mono-syllables by way of speech processing. The linguistic decoder section is used to identify the exact character based on the recognized series of mono-syllables provided by the acoustic processor section. In the acoustic processor section, the endpoints of the input mono-syllables are first detected and then the mono-syllables are recognized by way of "syllable recognition" and "tone recognition". By these ways, the correct syllables are determined. These recognized syllables are then sent to the linguistic decoder section so as to pick up the correct characters from those homonym characters having the same pronunciation. In this section, all characters having the same pronunciation are first found by the process of "Character Hypothesis Formation" and then by means of the "Markov Chinese Language Model" the maximum likelihood (or most probable) characters are formed as the output. If the output character is incorrect, the user can correct it directly on the screen.

The endpoint detection method in the above "acoustic processor" section is a well known technique to those skilled in the art of speech recognition. Basically, the input speech signal is first filtered and converted by an A/D converter into a series of digital data which is then transferred to the computer. Based on these digital data, the computer can calculate the "short-time energy" and "zero-crossing rate". Based on these two feature parameters, the computer can distinguish between the speech signal and noise. For instance, the "final" of a Mandarin syllable (the vowel or diphthong part but including possible medials or nasal ending) usually has higher "short-time energy" than the noise, but very often the "short-time energy" of the "initial" of a Mandarin syllable (the initial consonant) is relatively low but the "zero-crossing rate" of the "initial" is usually higher than that of the noise. As a result, the noise and speech signal can be effectively separated and after which further recognition is performed on the speech signal only. By employing such technique in speech recognition, most of the noise can be deleted.

The total number of different mono-syllables in Mandarin is about 1300. If the differences caused by lexical tones are disregarded, the total number of different mono-syllables in Mandarin is reduced from 1300 to about 400. For instance, if the syllables "ba-1" "ba-2" "ba-3" "ba-4" "ba-5" (here the numbers indicate the tone) are taken as five different mono-syllables, the total number of different mono-syllables will be about 1300. If they are taken as only one mono-syllable, the total number is about 400. It should be understood that the tones for the syllables is a special feature of Mandarin Chinese language. Every character is assigned a tone in general. Basically, there are five different tones. It has been shown that the primary difference for the tones is in the pitch contours, and the tones are essentially independent of the other acoustic properties of the syllables. It is therefore reasonable to divide the recognition of these 1300 mono-syllables into two parallel processes, one is to recognize the correct syllable among the 400 candidates disregarding the tones, the other is to recognize the tone among the five choices, as indicated in FIG. 1.

There are many confusing sets, i.e., sets of candidates for speech recognition which are very difficult to recognize, in the vocabulary of the 400 mono-syllables of Mandarin disregarding the tones. For instance, the a-set is (ba, pa, ma, fa, da, ta, na, la, ga, ka, ha, cha, sha . . . t). The pronunciation of these syllables are very close to one another, i.e., almost the same pronunciation except for the very short initial consonants, therefore, to correctly recognize each syllable is very difficult. This makes the recognition of the 400 syllables disregarding the tones very difficult. By employing the special training algorithm for the "Continuous Hidden Markov Model" method developed in Taiwan University, the above-mentioned problems can be solved.

Figure 2:
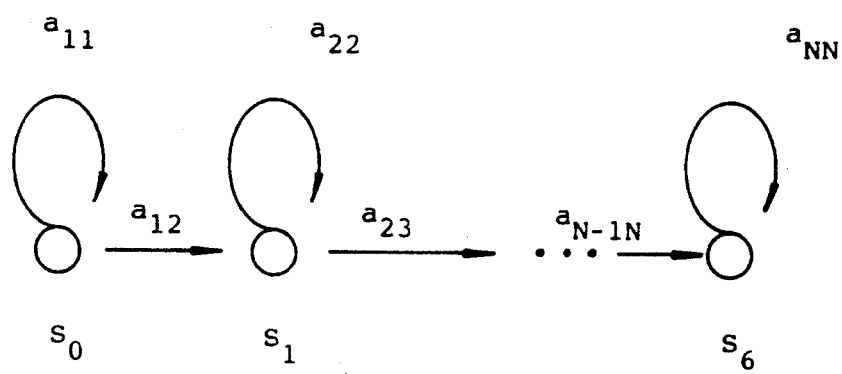
FIG. 2 illustrates the principles of the "Hidden Markov Models" in accordance with the present invention.

FIG. 2 illustrates the basic principle of "Hidden Markov Model". The speech recognition by way of "Hidden Markov Model" is a well-known method to those skilled in the art. In this method, a model is assigned to each possible speech candidate based on the "Training Speech" provided by the user. (That is, the user can input his speech signal to the machine as the Training Speech.) For instance, if the ten digits 0, 1, 2, ... 9 are to be recognized by the machine, these digits should be first read by the user and provided to the computer as the Training Speech. In the computer, a model for each of the 0, 1, 2, ... 9 digits is established based on the corresponding Training Speech for each digit. This process of establishing a model using the Training Speech is usually referred to as the "training" process. The common "training" method usually used are "forward/backward algorithm" and "parameter re-estimation". These methods are well-known to those skilled in the art. The basic principle for these method is that the parameters for the description of the model are first given some initial values and then slowly adjusted according to the Training Speech in the process of "training" until the correct values are obtained. At the time of recognition, for every unknown speech signal which has been entered to the computer, the computer will calculate the probabilities with which this unknown speech signal can occur for each model of the candidates. The model with the highest probability will be the result of the recognition. For instance, if Model "5" is calculated to give the highest probability, then "5" is thus recognized.

Assuming there is a series of hidden "states", $S_0$, $S_1$, ... $S_6$, etc (as shown in FIG. 2) representing the model of a certain syllable such as "ba". When this syllable is pronounced, the "states" of the voice producing system, i.e., the vocal tract, the glottis, etc. of the speaker is slowly shifted from $S_0$, $S_1$, $S_2$ ... until the last, $S_6$. Several parameters can be used to describe these "states". For instance, the probabilities that the voice producing system is at each state at the beginning of the pronunciation (initial probabilities) and the probabilities that the voice producing system is shifted from one state to another state during the pronunciation (transition probabilities). However, these "states" cannot be calculated or observed, because we can only observe the feature parameters of the unknown speech signal (can be calculated from the unknown speech signal). Therefore, the probabilities that certain feature parameters of the speech signal will be observed when the voice producing system is staying at a certain "state" (observation probabilities) can be calculated. As a result, for every syllable a "Hidden Markov Model" can be established. That is, the above various probabilities can be calculated through the "training" process using the Training Speech of the user. When some unknown speech signal is entered, the probabilities that the feature parameters for the unknown speech signal will be observed for each syllable model can be calculated. The syllable for the model with the highest probability is the result of the recognition.

Figure 3:
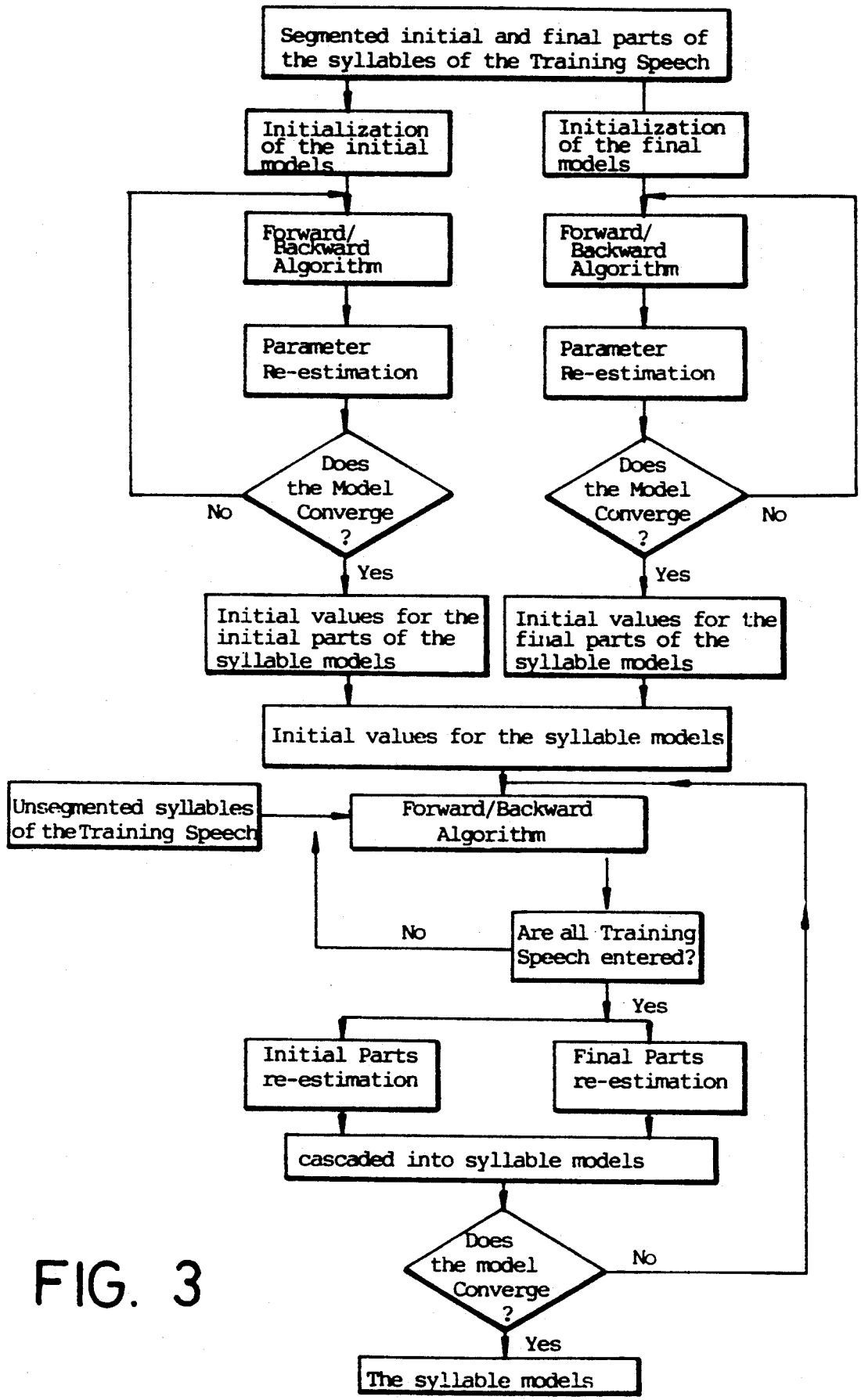
FIG. 3 illustrates the flowchart of the training algorithm for the "Hidden Markov Models" to recognize the Mandarin syllables in accordance with the present invention.

The recognition of the approximate 400 Mandarin syllables disregarding the tones is carried out by the "Hidden Markov Model." That is, one model is established or trained for every syllable, and for an unknown speech signal the probabilities that this unknown speech signal is produced by each of the approximate 400 models are calculated. The syllable for the model with the highest probability will be the result of the recognition. The approximate 400 syllables in Mandarin speech are very confusing. Those syllables sharing some common "final" (the vowel or diphthong part but including possible medials or nasal ending) but with different front "initials" (the initial consonants) actually form the so-called "confusing sets" in speech recognition which are generally very difficult to recognize (for instance, the syllables a, ba, pa, ma, fa, da, ta, na, la, ga, ka, ha, ja, cha, sha, . . . form a confusing set). Among the approximate 400 syllables, there are altogether 38 such "confusing sets", each with a particular "final", and due to such confusing sets, if the conventional "Hidden Markov Model" is used in the recognition, the recognition rates will be very low. By considering the special characteristics of the "confusing sets", the present invention develops a "Cascaded Training Method". The flowchart is shown in FIG. 3. Referring to FIG. 3, this method is designed so as to overcome the difficulties caused by the confusing sets. For instance, the syllables "ba", "da" possess the common "final", but the "initials" are different, and thus they cannot be easily distinguished. The training algorithm for the "Cascaded Training Method" is divided into 3 steps as in FIG. 3. Firstly, the "Training Speech" (i.e., the syllables produced by the user) are segmented into the "initial parts" and "final parts". The segmented "initial parts" are then used in training so as to obtain the hidden Markov models of the "initial parts" such as "b-" and "d-" and the segmented "final parts" are used in training so as to obtain the hidden Markov models for the "final parts" such as "a". After that these two sets of models are cascaded to form the hidden Markov models of syllables such as "ba" and "da". In the third step, the unsegmented syllables of the "Training Speech" are used to further "train" the models of the syllables by means of the "forward/backward algorithm" and "parameter reestimation" and by employing the above obtained syllable models as the initial model values in the training process. The syllable model can thus be finally calculated. This type of model will provide much higher recognition rate in the syllable recognition.

Basically, there are "continuous" and "discrete" "Hidden Markov Models". The difference between these two types is whether the speech feature parameters are represented in continuous or discrete forms. It was found that only about 65% of recognition rate is obtained in the "discrete type" while 90% of recognition rate is obtained in the "continuous type". The present invention thus employs the "continuous hidden Markov models".

In FIG. 1, the "tone recognition process" is used to recognize the correct tone of the syllable (including the four different tones and the neutral tone in Mandarin). The method employed is still the above-mentioned "Continuous Hidden Markov Model". That is, five "hidden Markov Models" are established and trained for the five different tones. The machine calculates the probabilities for the five models to generate the unknown syllable, The model giving the highest probability is the result of the recognition. The difference is, however, the selected feature parameters should now include the pitch frequency (which determines the pitch of the voice), short-time energy and syllable duration. In accordance with the present invention, by employing the "Continuous Hidden Markov Model" technique with the specially chosen feature parameters, much higher recognition rates for the tones can be obtained.

The above-mentioned "syllable duration" refers to the entire duration of the syllable. It was found from experiments that the syllables of neutral tone usually have relatively lower energy and shorter duration. By introducing these two feature parameters of short-time energy and syllable duration into the probability calculation of the "hidden Markov Model", the recognition rates of tones for the present invention can be increased up to a maximum of 95%.

Figure 4:
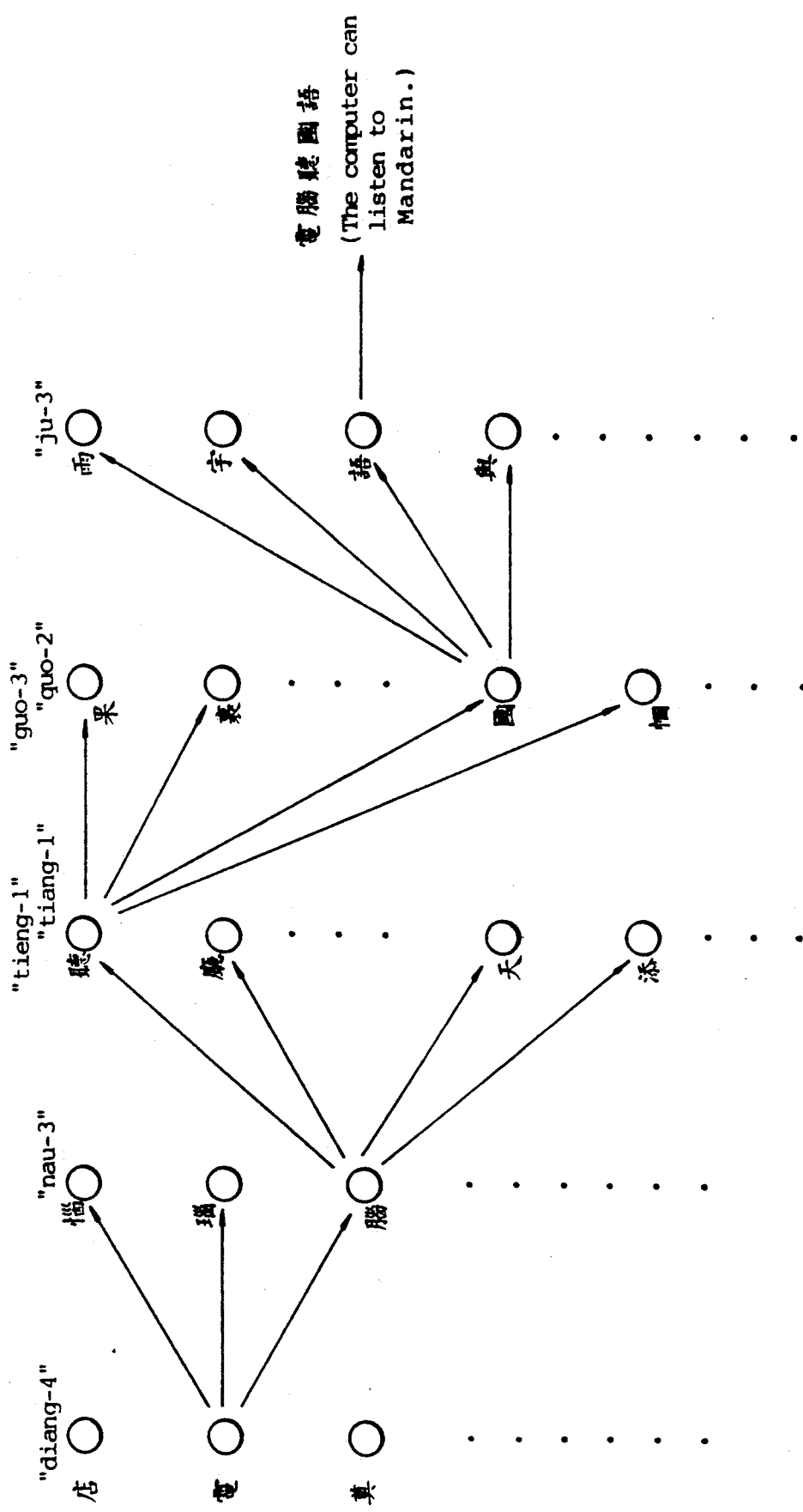
FIG. 4 illustrates the "Chinese Language Model" based on the "Markov Model" in accordance with the present invention.

Referring to FIGS. 1 and 4, in particular to the linguistic decoder section. When a series of recognized syllables is provided by the acoustic processor section, all possible homonym characters for the given syllables are accessed by the "Character Hypothesis Formation" process. This is done by simply looking up a dictionary stored in the machine. Sometimes some syllables are rather confusing and it is difficult to make a decision in the acoustic processor section, for instance, in FIG. 4, the syllables "tieng-1" and "tiang-1" are very confusing. If the acoustic processor section cannot determine the exact answer, both choices will be provided to the "Character Hypothesis Formation" process, and the homonym characters for all possible choices of syllables will be listed and transferred to the "Markov Chinese Language Model" for final determination. This "Markov Chinese Language Model" is rather similar to the "Hidden Markov Model" discussed above, but in this case, every Chinese character per se is a "state" and the transition probability from each state to another state is pre-calculated and stored in the machine. These probabilities can also be "trained" by large quantities of "training texts", as described in the following.

The training method of the "Markov Chinese Language Model" (FIG. 4) is as follows: For instance, if 20,000 characters of newspaper texts are entered into the computer as the "training texts", the programs in the computer will count the occurrence frequencies for all characters to appear adjacent to one another. For instance, the character "中" appears for 150 times, but the characters "中央" appears together only for 32 times, and the characters "中心" appears together for 28 times., etc. The computer will thus calculate the probability for each pair of characters to appear adjacent to each other. When the acoustic processor section produces a series of recognized syllables, the program of the Language Model has formulas to calculate the probability for each possible combination of the homonym characters for the given syllables to be in a sentence. For instance, in FIG. 4, there are many homonym characters for the syllables "diang-4" and "nau-3". But "電腦(computer)" is the most probable combination of the homonym characters for these two syllables. Similarly, while the syllables "guo-2" or "guo-3" and "iu-3" all have many homonym characters, but only the combination to form the word "國語(Mandarin)" is the most probable. When all these are combined for the input series of syllables "diang-4, nau-3, tieng-1, guo-2, iu-3", the combination of homonym characters."電腦能聽國語 (The computer can listen to Mandarin)" is greater than any other combinations of homonym characters, and is therefore chosen as the output sentence due to the highest probability. In this way the Chinese language model can even correct some of the errors made in the acoustic processor section. As in the above example in FIG. 4, the syllables "guo-3" and "guo-2" are very confusing, and probably the wrong syllable "guo-3" has higher probability and therefore are taken as the first choice result. However, due to the fact that the combination of the syllables "guo-2" and "iu-3" corresponds to a more frequently used word "國語", the correct syllable "guo-2" will finally be chosen by the Chinese language model and the error is therefore corrected. In another example, if the texts of the Chinese textbooks for primary school are entered into the computer as the "Training texts", the computer will calculate the occurrence frequency for each pair of characters to appear adjacent to each other and so on in these texts, so as to form the Language Model for primary school textbooks. In fact, in this way every user can use the appropriate "Training texts" to train his own Language Model.

The following describes the process to correct errors in the output characters using convenient software. When a sentence is read to the machine, the screen displays the recognized series of syllables in phonetic symbols and a series of Chinese characters as the output. The user can easily correct either the phonetic symbols or the characters by moving the cursor on the screen to the desired phonetic symbol or character. If the phonetic symbols for a syllable are be corrected, the software will open a window to display on the screen the phonetic symbols of those syllables with the second, third, ... highest probability calculated in the process of syllable recognition. If the Chinese character is to be corrected, the screen will also open a window to display the Chinese characters of the second, third, ... highest probability calculated in the Markov Chinese language model. Thus in most cases the desired answer will be easily found in the window. The correction can therefore be completed in most cases by simply pressing a few function keys from the keyboard. Thus the time needed in correcting operation is very short. In accordance with the present invention, the final dictation rate for the characters exceeds 90%. That is, for 180 characters entered per minute, the number of incorrect characters is about less than 20.

The number of Chinese characters and words in the vocabulary which can be dictated in accordance with the present invention depends on the number of characters and words in the "training texts" which have been used in the training of the Markov Chinese language model. In one embodiment in accordance with the present invention which has been recently completed, about 15,000 characters, and 40,000 words are in the "training texts". If more training texts are used the number of characters and words which can be dictated will be naturally enlarged.

Figure 5:
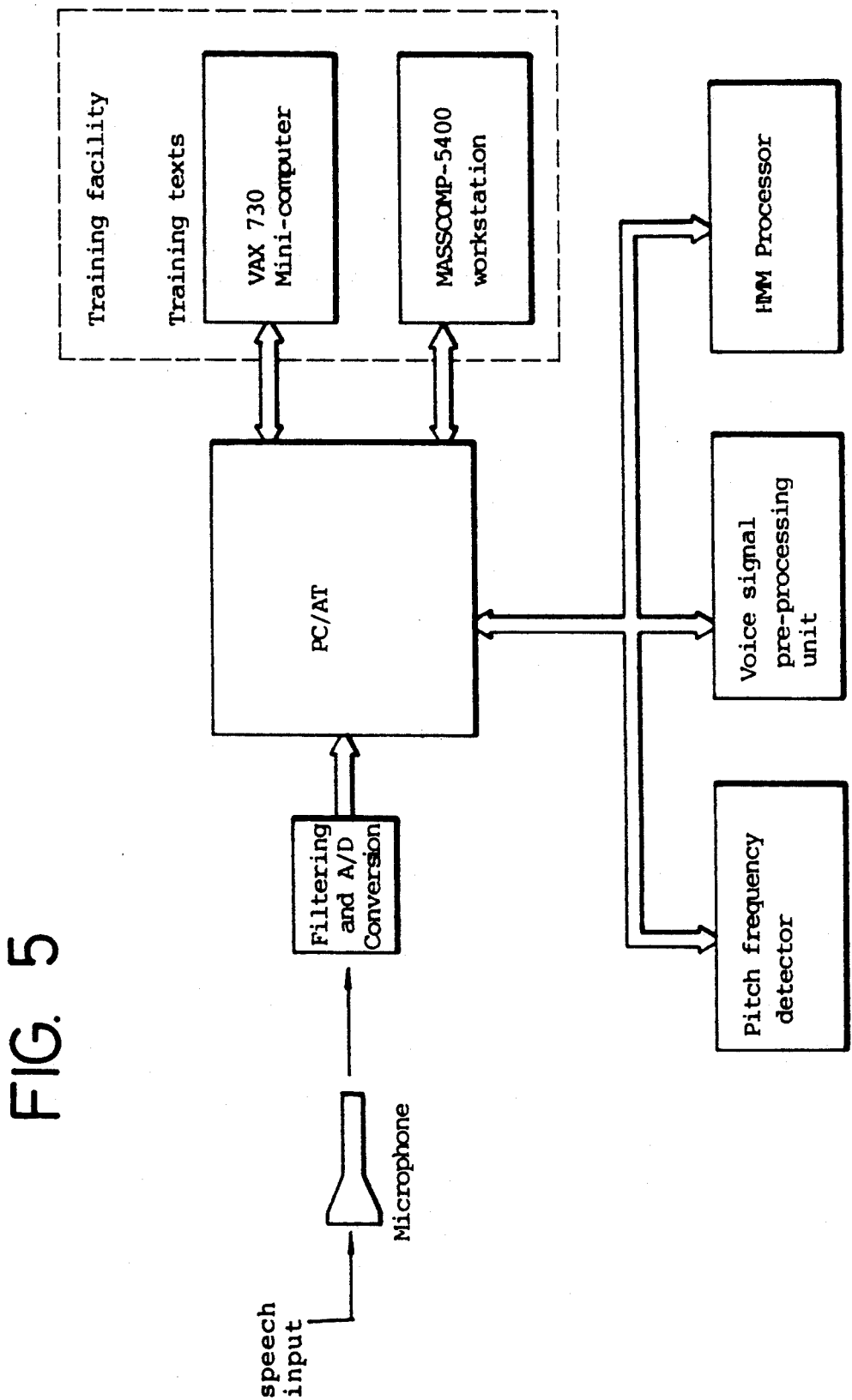
FIG. 5 illustrates the overall system of a preferred embodiment in accordance with the present invention.

FIG. 5 indicates another preferred embodiment in accordance with the present invention. A personal computer can be of IBM PC/AT type. The present invention comprises a pitch frequency detector, a voice signal pre-processing unit and a Hidden Markov Model processor, all connected to the personal computer. The speech signal is entered through a microphone and a speech signal filter and an A/D converter, which is then converted into a digital signal and entered into the computer. The pitch Frequency Detector detects the characteristics of the pitch frequency of the unknown speech signal and send them to the personal computer, in which the Markov Model probabilities of the five different tones are calculated. The recognition of the tones is done at the personal computer. On the other hand, the feature parameters for the unknown speech signal and endpoint detection of every syllable required for the syllable recognition process are calculated at the "Voice Signal Pre-processing Unit", and then transferred to the "Hidden Markov Model Processor". The calculation of the probabilities for the 400 hidden Markov Models of the 400 syllables is done at this "Hidden Markov Model Processor". After the syllables are recognized, the first of several choices are sent to the personal computer. The probability parameters of the Markov Chinese Language Model obtained from the training texts are stored in the personal computer, and the operations of the Markov Chinese Language Model and the final choice of the output Chinese sentences are all performed in the personal computer. For every user, the syllables of the Training Speech are entered into a Masscomp-5400 workstation, where the parameters of all the syllable hidden Markov models are evaluated and then transferred via the personal computer to the "Hidden Markov Model Processor". A mini-computer VAX 730 is used to train the parameters for the Markov Chinese language model using the training texts and the results are stored in the personal computer.

FIG. 6 is the circuit block diagram of the "Speech Signal Pre-processing Unit". There are altogether 3 CPUs to process in parallel to complete all the required calculations in real-time. In the present preferred embodiment, 3 Texas Instruments TMS 320C25 chips are used for these three CPUs. Other components used in this figure are memories and decoding circuits for connection and data transmission to other components.

Figure 7A:
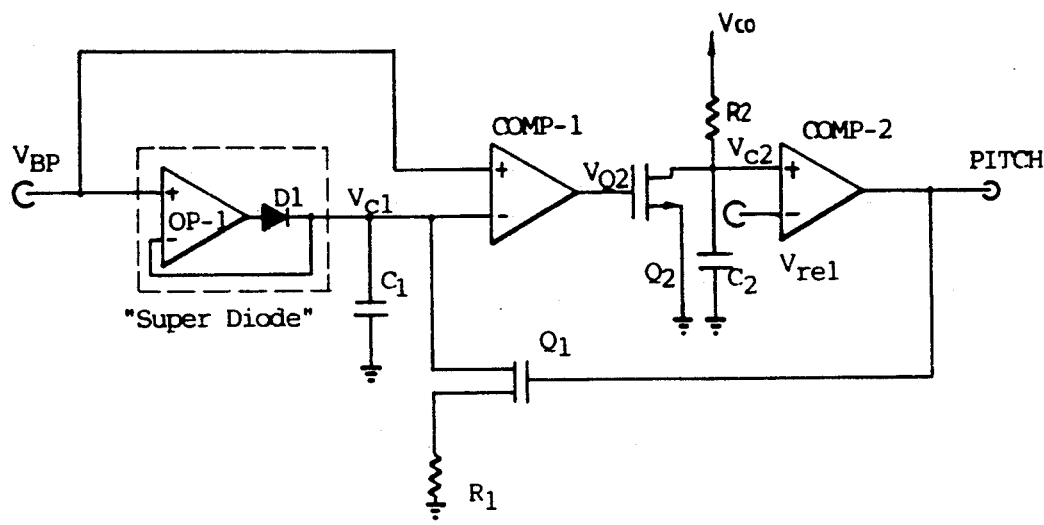
FIG. 7 illustrates the "Pitch Frequency Detector" of FIG. 5 in accordance with the present invention.
Figure 7B:
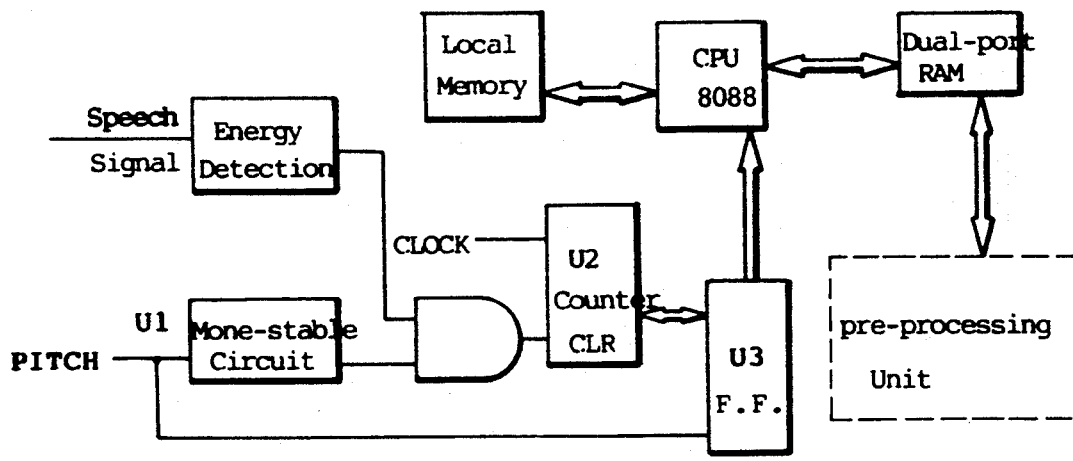

FIG. 7 is the circuit diagram for the "Pitch frequency Detector", which is well-known to those skilled in the art.

Figure 8:
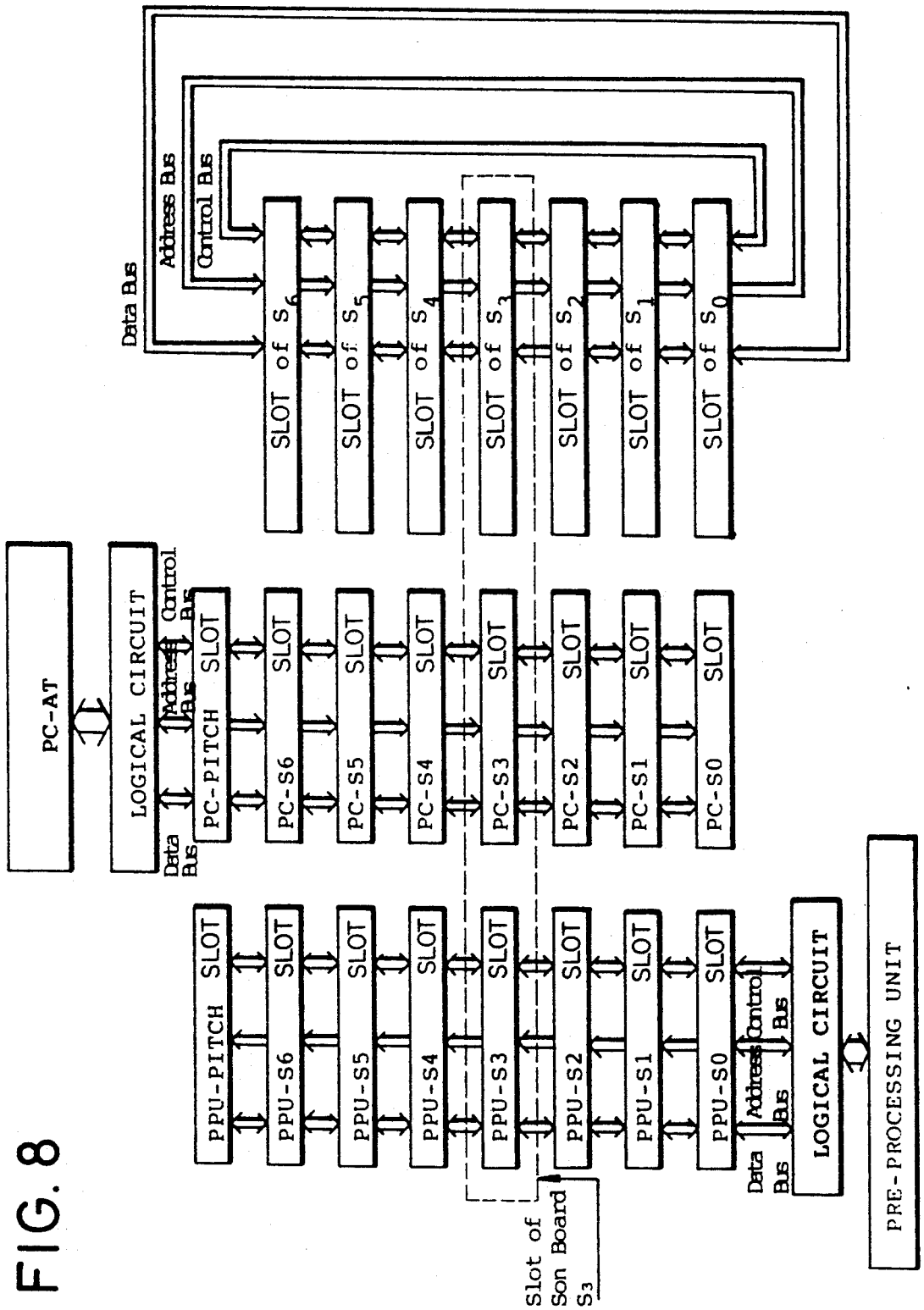
FIG 8 to 11 illustrate the "Hidden Markov Model Processor" of FIG. 5 in accordance with the present invention.
Figure 9:
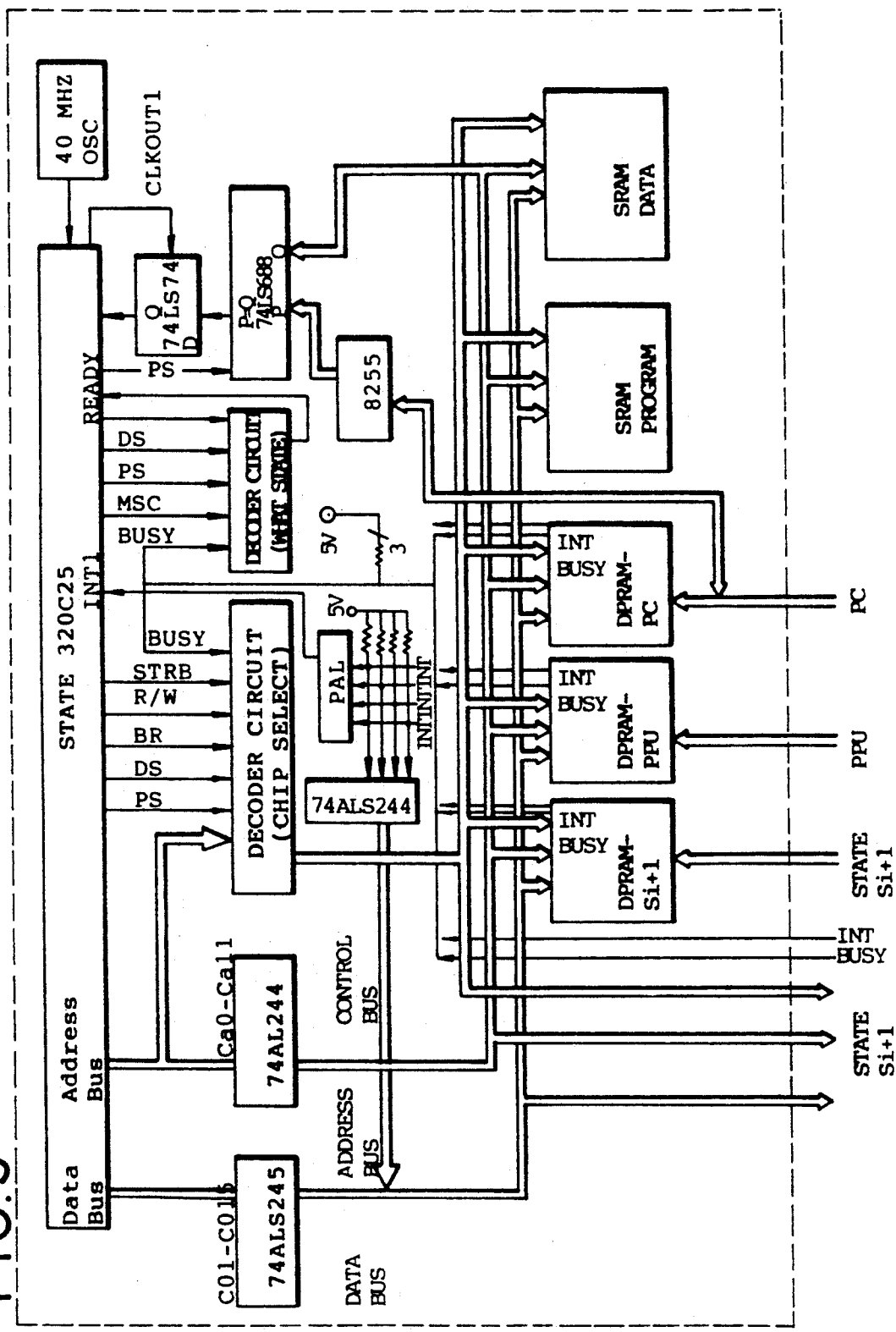
Figure 10:
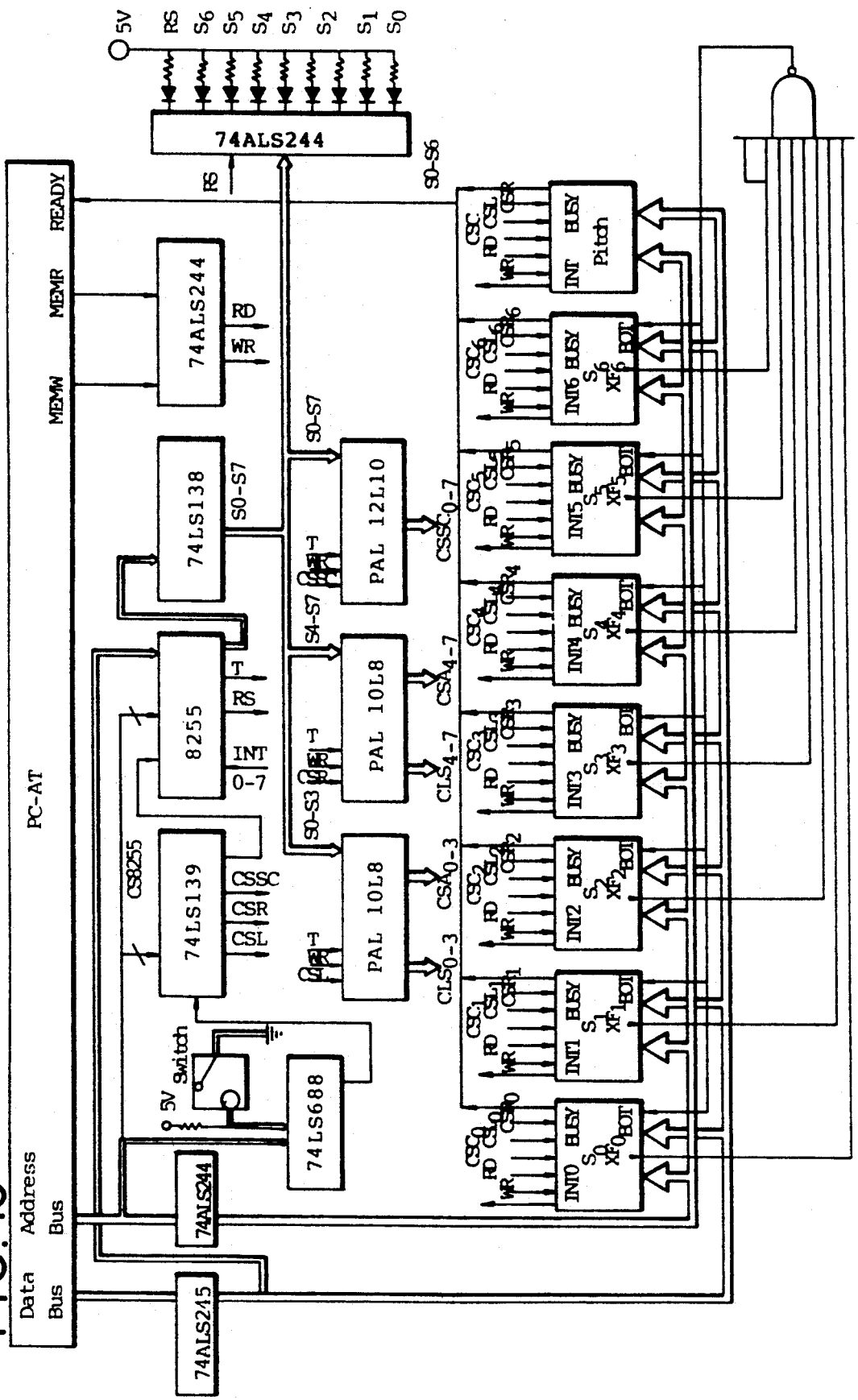
Figure 11:
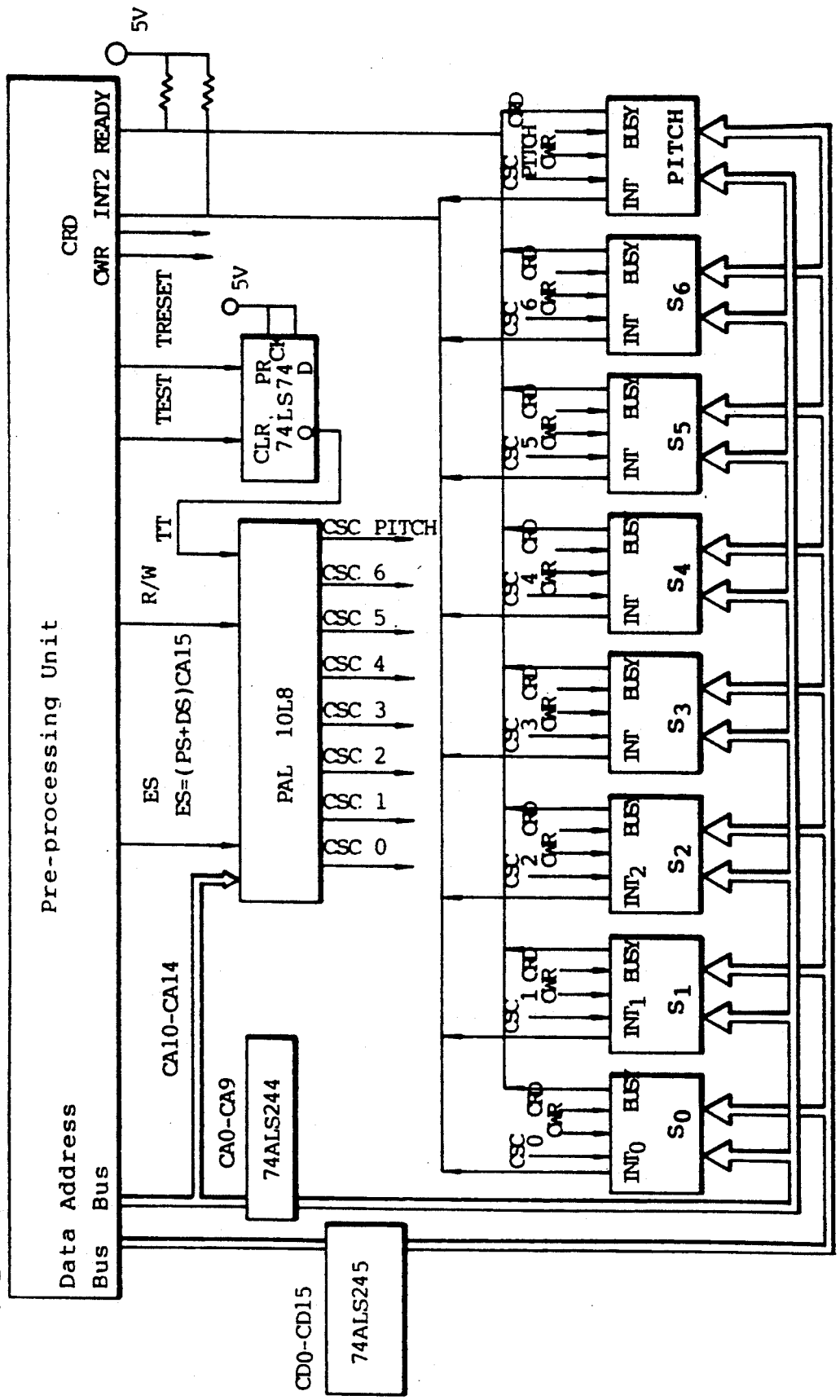

FIG. 8 to 11 are schematic diagrams of the "Hidden Markov Model Processor". The processor comprises a base board and a plurality of subsidiary boards. FIG. 8 indicates the arrangement on the base board, on which the slots for the mounting of the subsidiary boards $S_0$, $S_1$, ... $S_6$ and the interconnection of each board with other boards, the personal computer and the "Speech Signal Pre-processing Unit" are clearly shown. FIG. 9 illustrates the circuit diagram of each subsidiary board. On each subsidiary board there is a Texas Instruments TMS 320C25 chip as the CPU thereof which is used for calculation, and other memories and decoding circuits and so on. FIG. 10 is the circuit diagram showing the connection between the 7 subsidiary boards and the personal computer. FIG. 11 is the circuit diagram showing the connection between the 7 subsidiary boards and the "Speech Signal Pre-processing Unit". The operation principles can be easily understood to those skilled in the art.

Figure 12:
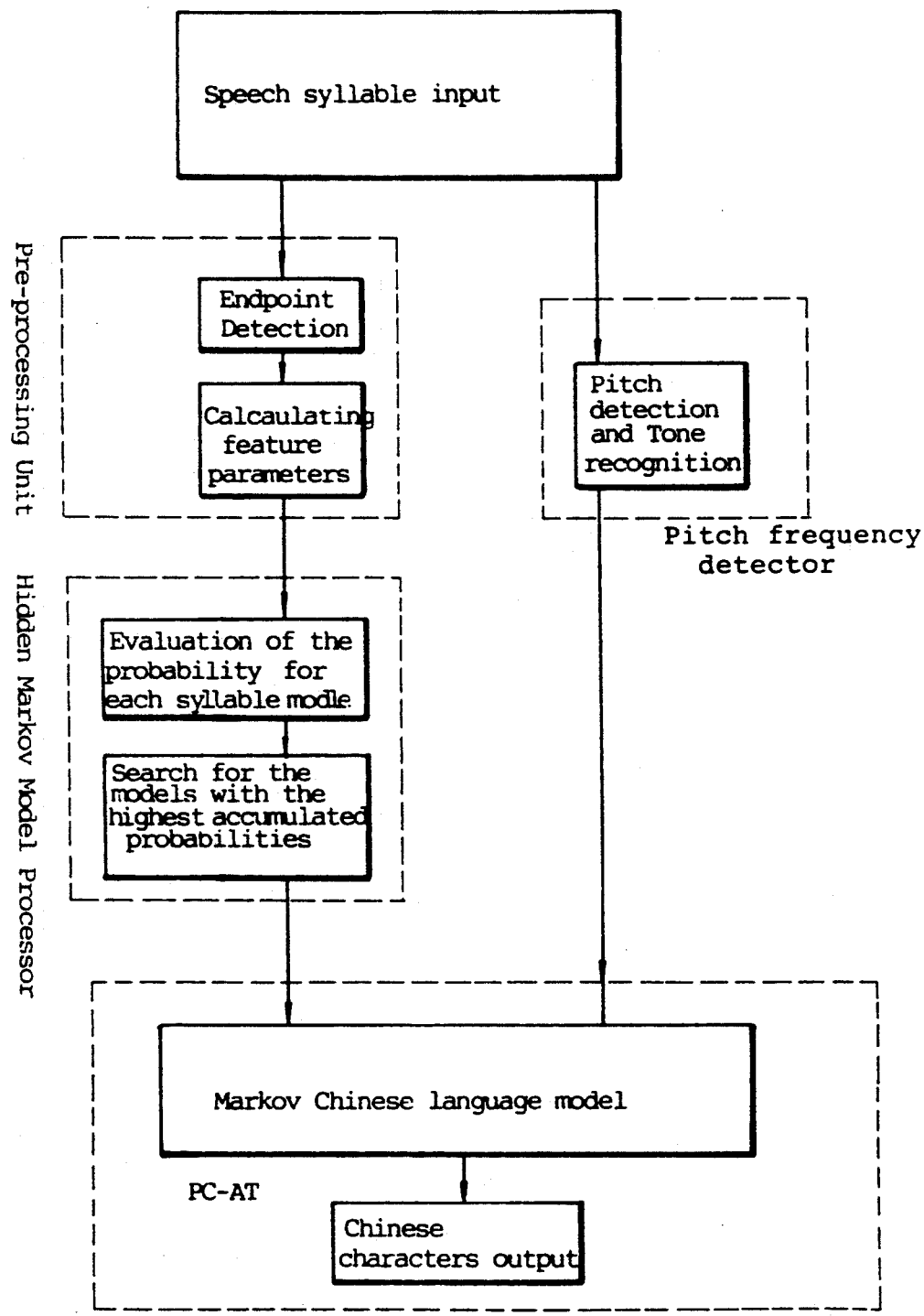
FIG. 12 illustrates the flowchart of the overall software system of FIG. 5 at the recognition phase.

FIG. 12 is a flowchart of the overall software system used in the recognition phase in accordance with the present invention. These-programs are respectively stored in the personal computer and executed by the personal computer and the TMS 320C25 chips.

It should be evident that various modifications can be made to the described embodiments without departing from the scope of the present invention.

I claim:

1. A speech recognition method comprising steps of:
   segmented a training speech syllable into an initial part and a final part;
   training a Continuous Hidden Markov Model (CHMM) on the initial part to create an initial part model having trained initial part model parameters;
   training a CHMM on the final part to create a final part model having trained final part model parameters;
   training a CHMM on the training speech syllable to create a syllable model using the trained initial part parameter values and the trained final part parameter values as starting parameters for the syllable model;
   operating on an object speech sample with the syllable model;
   recognizing the object speech sample as an object speech syllable based on a degree of match of the object speech sample to the syllable model;
   representing the object speech sample as a Chinese character in accordance with the object speech syllable.

2. A method as in claim 1 further comprising a step of training a CHMM on a Mandarin tone in an input speech syllable to create a tone model.

3. A method as in claim 2, wherein the step of training a CHMM to create a tone model includes a step of training on pitch frequency, short time energy, and duration of an input speech syllable.

4. A method as in claim 1 further comprising steps of:
   training a Markov Model (MM) on a sequence of chinese characters as used in context to create a Chinese language model;
   operating on a sequence of object speech syllables in the object speech sample with the Chinese language model; and
   representing the object speech sample as a Chinese character sequence in accordance with a match of the sequence of object speech syllables to the Chinese language model, thereby representing the object speech sample as a Chinese character sequence in accordance with a sequence of matches to the object speed syllables.

5. A speech recognition apparatus as in claim 4, further comprising:
   a display connected to the computer for illustrating a recognized Chinese syllable; and
   an input device connected to the computer for receiving corrections from an operator.

6. A speech recognition apparatus for Mandarin speech including high level, high rising, low dipping and high falling lexical tones, comprising:
   a speech signal filter for receiving a speech signal and creating a filtered analog signal;
   an analog-to-digital (A/D) converter connected to the speech signal filter for converting the filtered analog signal to a digital speech signal;
   a computer connected to the A/D converter for receiving and processing the digital signal;
   a pitch frequency detector connected to the computer for detecting characteristics of the pitch frequency of the speech signal thereby recognizing tones in the speech signal;
   a speech signal pre-processor connected to the computer for detecting the endpoints of syllables of speech signals thereby defining a beginning and ending of a syllable;
   a Hidden Markov Model processor connected to the computer for determining degrees of match between the speech signal and a syllable model, a tone model and a language model and recognizing speech signal syllables based on the degrees of match;
   a training apparatus connected to the computer for training an initial part Hidden Markov model and a final part Hidden Markov model and for training a syllable model based on trained parameters of the initial part Hidden Markov model and the final part Hidden Markov model.

7. A speech recognition apparatus as in claim 6 further comprising:
   a Chinese Language Model training apparatus connected to the computer for training a Markov Chinese Language Model.

8. A speech recognition apparatus as in claim 6 further comprising:

a tone training apparatus connected to the computer for training the tone model.

9. A Mandarin tone recognition method comprising steps of:

dividing training syllable utterances into five groups according to tones of the syllable utterances;

training a Hidden Markov Model (HMM) on the five groups of training syllable utterances to create a Mandarin tone model;

operating on an object speech sample with the Mandarin tone model;

recognizing the object speech sample as an object Mandarin tone based on a degree of match of the object speech sample to the Mandarin tone model;

representing the object speech sample as a Mandarin tone in accordance with the object Mandarin tone.

10. A method as in claim 9, wherein the step of training a HMM to create the Mandarin tone models includes a step of training on pitch frequency, short time energy, and duration of an input speech syllable.

* * * * *